United States Patent [19]

Wilkins

[11] Patent Number: 5,325,890
[45] Date of Patent: Jul. 5, 1994

[54] SANITARY COUPLING

[75] Inventor: Steven Wilkins, Union City, Pa.

[73] Assignee: Snap-Tite, Inc., Union City, Pa.

[21] Appl. No.: 92,208

[22] Filed: Jul. 15, 1993

[51] Int. Cl.[5] .............................................. F16L 37/28
[52] U.S. Cl. ............................ 137/614.03; 137/614.05
[58] Field of Search ...................... 137/614.03, 614.04, 137/614.05, 614, 614.06

[56] References Cited

U.S. PATENT DOCUMENTS

| | | | |
|---|---|---|---|
| 3,613,726 | 10/1971 | Torres | 137/614.03 |
| 4,086,939 | 5/1978 | Wilcox et al. | 137/614.03 |
| 4,804,015 | 2/1989 | Albinsson | 137/614.03 |
| 4,890,642 | 1/1990 | Smazik et al. | 137/614.03 |
| 5,004,013 | 4/1991 | Beaston | 137/614.05 |

FOREIGN PATENT DOCUMENTS

| | | | |
|---|---|---|---|
| 1084449 | 7/1954 | France | 137/614.03 |
| 1020928 | 2/1966 | United Kingdom | 137/614.03 |

Primary Examiner—Martin P. Schwadron
Assistant Examiner—Kevin L. Lee
Attorney, Agent, or Firm—Woodling, Krost & Rust

[57] ABSTRACT

A sanitary coupling comprising a coupler member and a nipple member. The coupler member and the nipple member have first and second passageways including first and second transverse ports and first and second longitudinal bores such that, when engaged, fluid and/or fluid and solids may flow unobstructed through the coupler and nipple members. Means for orienting the coupler member with respect to the nipple member provide alignment of said passageways of said nipple and coupler members with respect to each other for full, unobstructed flow.

16 Claims, 8 Drawing Sheets

SANITARY COUPLING

FIELD OF THE INVENTION

This invention relates to a coupling for use in sanitary applications. Particularly, this coupling is used in those applications which require sanitary conditions in handling of fluids and solids which may contain disease. These sanitary couplings are typically used in connection with hospital waste. The sanitary coupling is positioned underneath a hospital bed permitting the cleaning of the bed and the conduction of fluids and solids from the bed into a bed pan. The fluids and solids are then pumped to and through the sanitary coupling. The ultimate destination for this fluidic and solid waste is a receptacle which is typically a bottle that is mounted on a panel underneath the hospital bed.

The sanitary coupling of the present invention is also usable in other instances where sanitary conditions must be maintained. Food processing is one of those instances where sanitary conditions must be maintained. Other manufacturing processes also require sanitary conditions for which the present invention would be useful.

BACKGROUND OF THE INVENTION

Standard couplings are presently in use in connection with sanitary applications. These couplings, however, exhibit some notable shortcomings. Most prominent is the tendency of the standard coupling to clog with solid materials. The clogging necessitates the disassembly of the coupling and its cleaning. When clogging occurs the coupling is no longer serving its purpose, namely, to transmit and conduct certain solids and fluids into a receptacle on an uninterrupted basis.

The primary limitation of a standard coupling in transmitting solids and fluids is the character of the internal passageways that the solids and fluids must pass through on their way to the receptacle. The standard couplings usually have valves and other internal impediments which comprise a tortuous path. A tortuous path is conducive to solids becoming entrapped in the coupling. Additionally, tortuous paths in a coupling or a valve also create pressure drops which necessitate a higher powered pump to maintain a given flow rate through the coupling or the valve.

The clogging of the couplings that are presently available defeats the purpose of a sanitary system. The purpose is defeated by having to disassemble the coupling in the system to clean the coupling, thereby exposing a person to the hazardous or contaminated waste. The increased number of diseases that have been recently identified as hazardous or infectious dictate the need for a better coupling to handle the fluids and solids.

OBJECTS AND SUMMARY OF THE INVENTION

It is an object of the present invention to provide an unobstructed passageway through a coupling having a coupler member and a nipple member. The coupler member of the present invention has a bore located therein which leads to a transverse port. The bore and the transverse port, in combination, provide a direct unobstructed passageway through which fluids and solids easily pass. The nipple member also provides an unobstructed passageway through a second transverse port located in the second body member of the nipple member.

It is a further object of the present invention to provide a passageway through the sanitary coupling which offers very little resistance to the flow of fluids and/or solids and hence very little pressure drop through the coupling.

It is a further object of the present invention to enable the production of sanitary couplings at a reasonable cost to the consumer. This is done, in part, by using plastic materials. The unique structure of the present invention also enables production at a reasonable cost.

It is a further object of the present invention to provide a full flow coupling in any and all applications requiring sanitary couplings.

It is a further object of the present invention to provide a passageway for fluids and solids that are passed through first and second transverse ports. The first transverse port is located in the coupler member and the second transverse port is located in the nipple member. The sanitary coupling disclosed herein as the preferred embodiment contains means for identifying the orientation of the transverse port of the coupler member with respect to the transverse port of the nipple member.

It is a further object of the present invention to provide a coupling that has no obstruction in the passageway when the coupler and nipple members are united, or, put another way, engaged.

It is a further object of the present invention to provide a full flow coupling in any and all applications requiring sanitary conditions.

BRIEF DESCRIPTION OF THE DRAWINGS

The structure, operation, and advantages of the preferred embodiment of the invention will become further apparent upon consideration of the following description taken in conjunction with the accompanying drawings, wherein:

FIG. 4 also shows the coupler member and the nipple member latched together;

FIG. 5 is also a partial sectional view of the first body member of the coupler member;

DETAILED DESCRIPTION OF THE INVENTION

Figure 1:
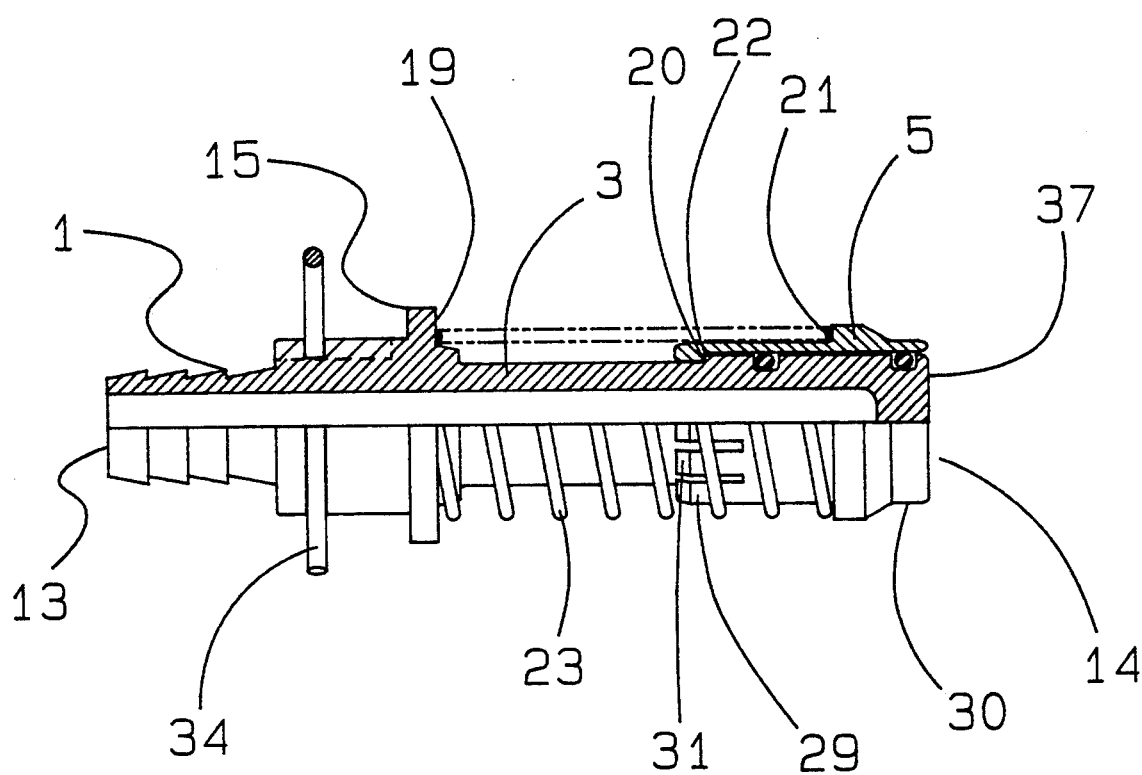
FIG. 1 is a side elevational view of the bottom half of the coupler member as well as a side sectional view of the top half of the coupler member.

The sanitary coupling is comprised of a coupler member 1 and a nipple member 2. The coupler member 1 has a first body 3 and a first passageway 4 as well as a first valve means 5. The nipple member 2 includes a second body 6, a second passageway 7 and a second valve means 8. The first and second body members 3 and 6, respectively, are generally cylindrically shaped in the preferred embodiment.

Figure 2:
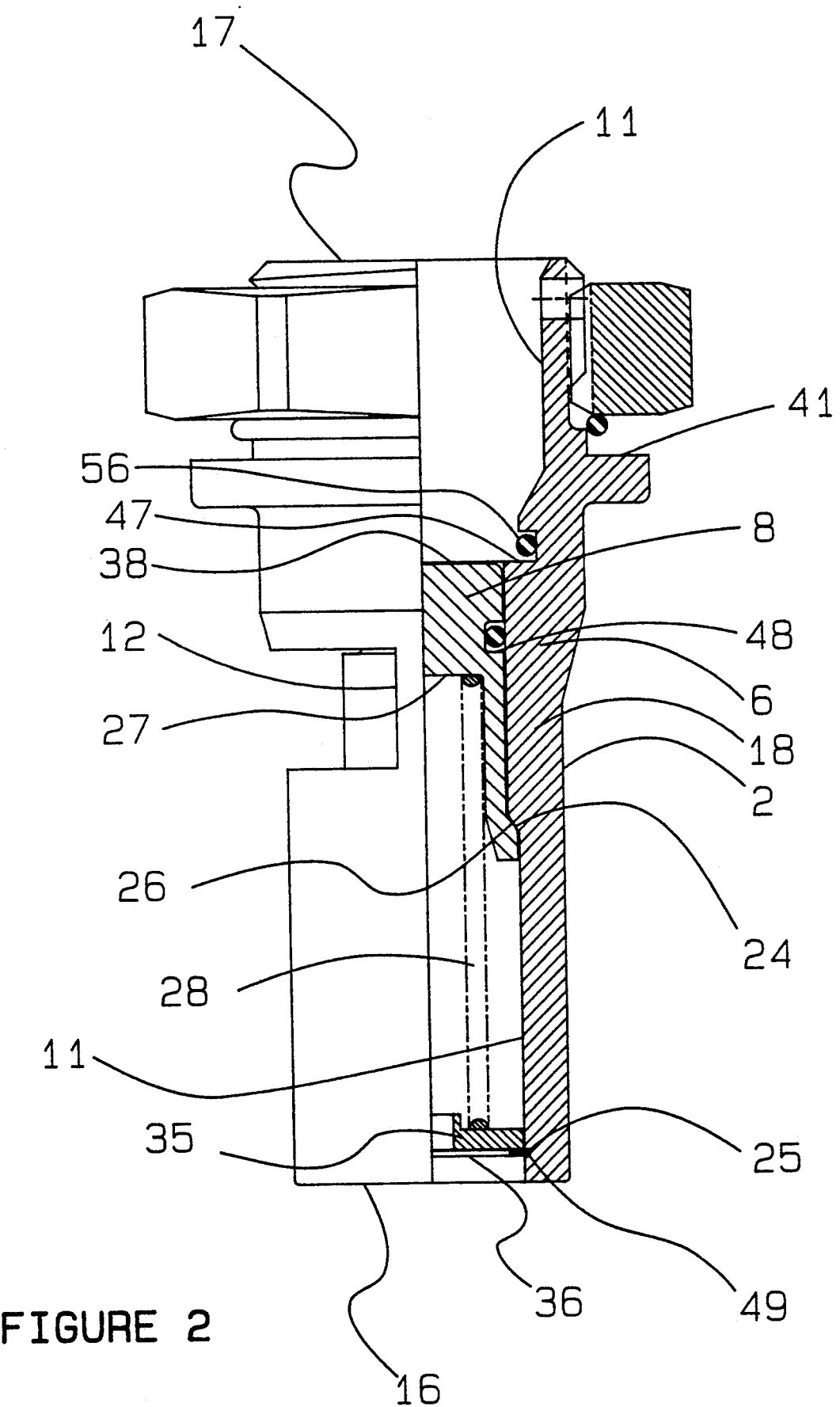
FIG. 2 is a side elevational view of the bottom half of the nipple member as well as a side sectional view of the top half of the nipple member.
Figure 3:
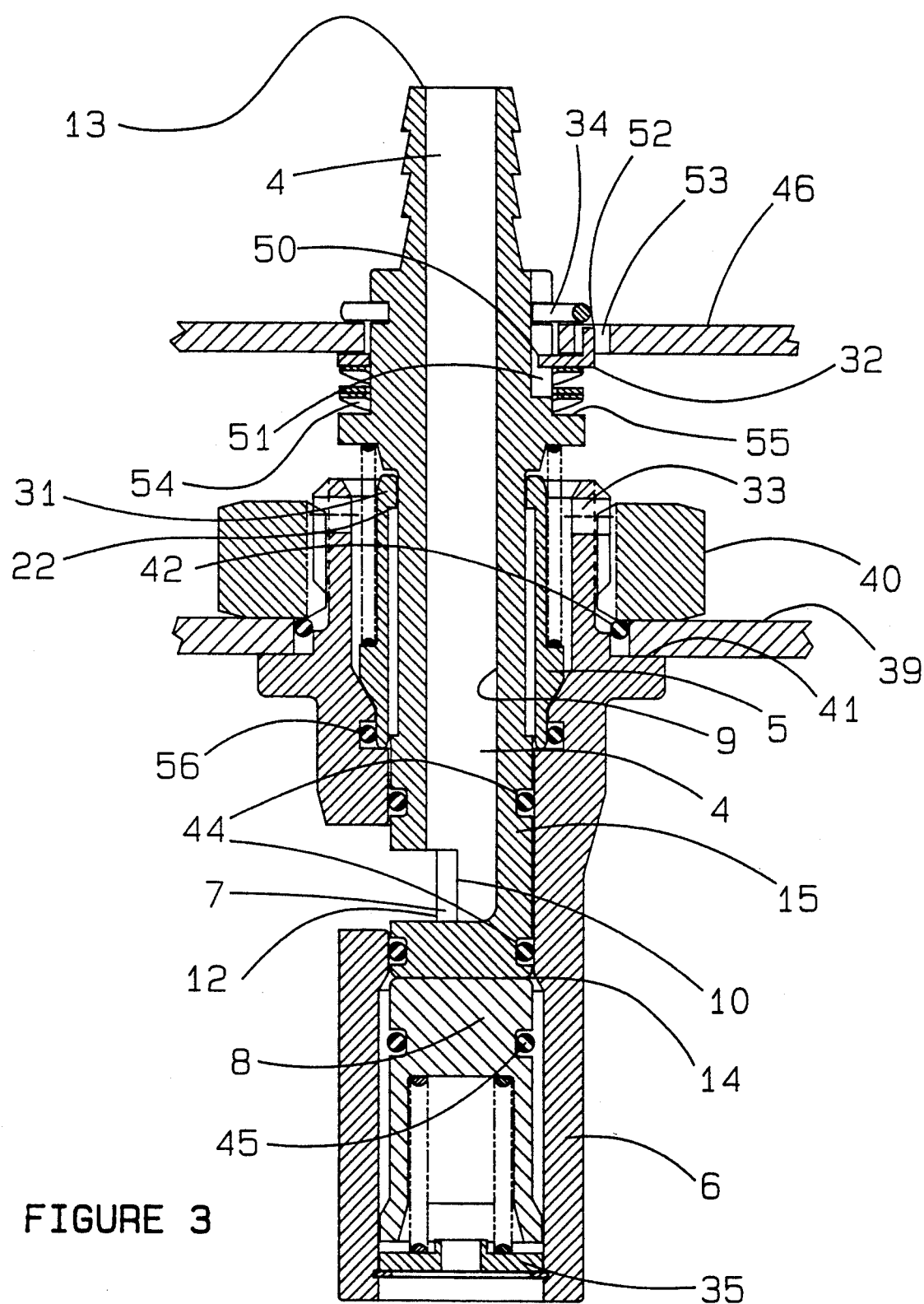
FIG. 3 is a side sectional view of the coupler and nipple members shown during union.
Figure 4:
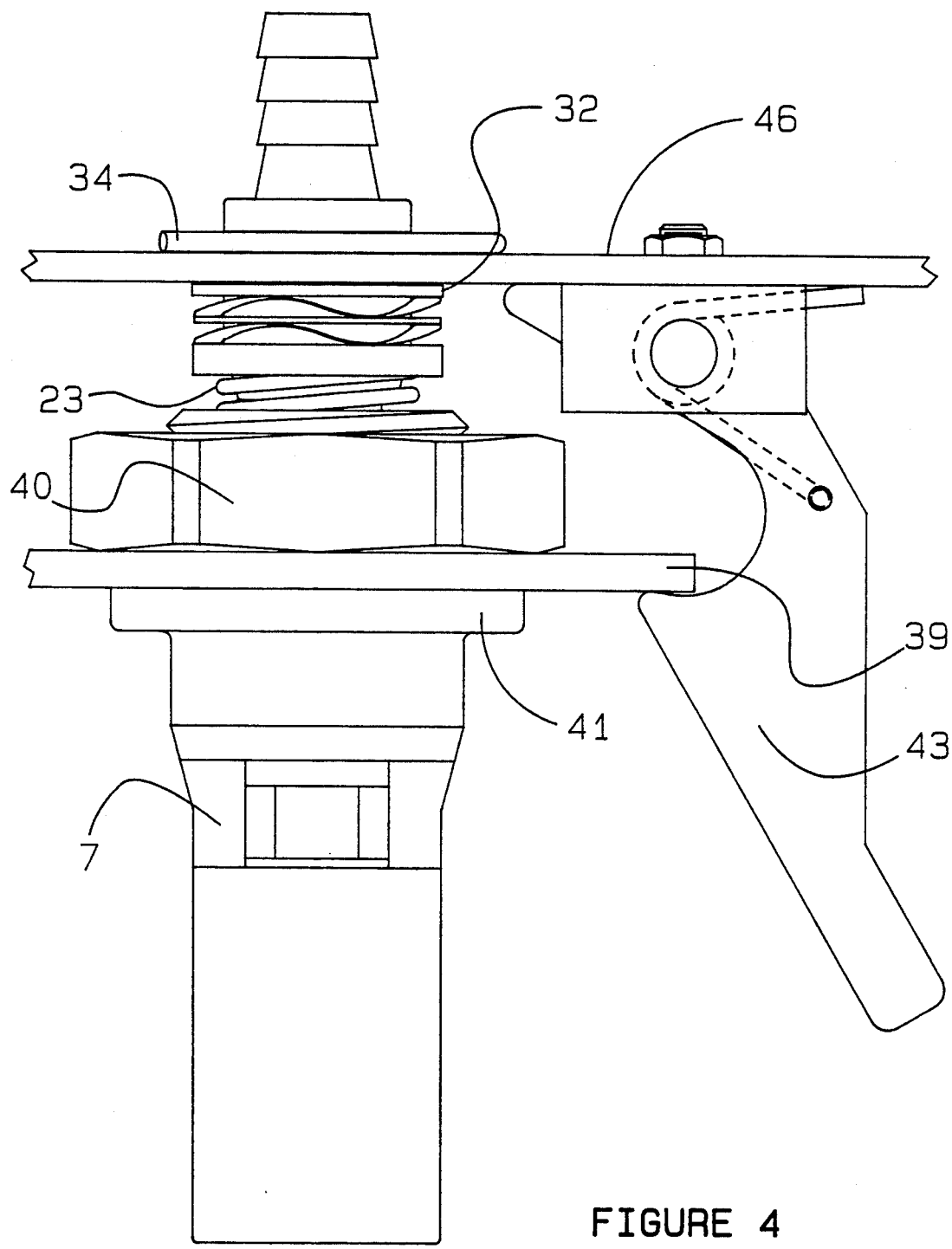
FIG. 4 is a bottom view of the coupler and nipple members shown during union with the ports of the coupler and nipple members aligned.
Figure 6:
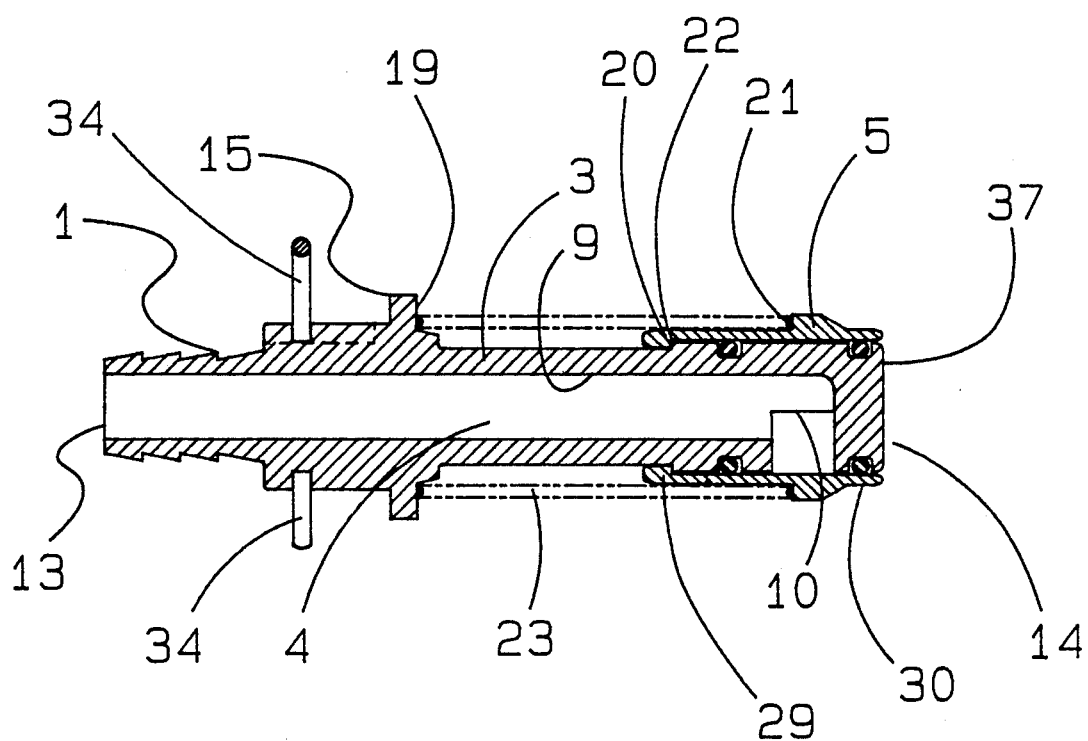
FIG. 6 is a side sectional view of the coupler member.

The first passageway 4 of the first body 3 includes a first longitudinal bore 9 and a first transverse port 10. The first longitudinal bore 9 of the preferred embodiment does not extend through the first body member 3 of the coupler member 1. The first transverse port 10 resides in the first body member of coupler member 1. The first transverse port 10 intersects the first longitudinal bore of the first body member. The first transverse port 10 is substantially radially oriented having an arc of 180 degrees. The first passageway 4 can pass fluids and/or solids when first valve 5 permits passage as is described hereinbelow. See, FIGS. 6 and 3. FIGS. 3 and 6 illustrate the first transverse port 10 of the first body member. FIG. 3 illustrates engagement of the coupler member and the nipple member 2. In FIG. 3, first transverse port 10 is open as is the second transverse port 12 and the second passageway 7. FIG. 6 illustrates the first port 10 closed by valve means 5. Similarly, FIG. 2 shows the second port 12 closed by valve means 8.

The coupler member has a first valve 5 movable between first and second positions. FIG. 1 depicts the first valve 5 in its first position. The first valve 5 has a first shoulder 21 and a second shoulder 22 located thereon. The first body member has a first shoulder 19 and a second shoulder 20. See, FIG. 5.

Figure 7:
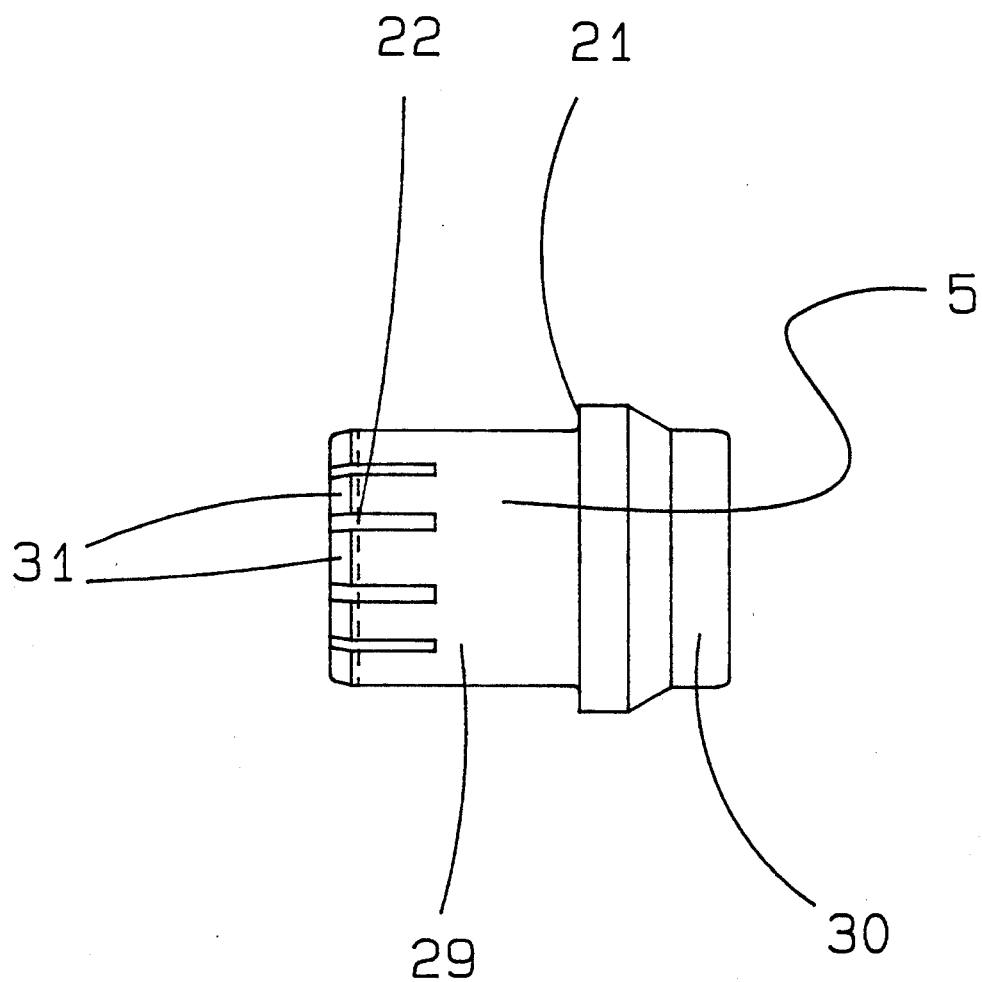
FIG. 7 is a side elevational view of the first valve.

In the preferred embodiment, the first valve 5 has a first end portion 29 and a second end portion 30 and is generally sleeve-shaped. See, FIG. 7. The first end portion 29 of the first valve 5 includes flexible fingers 31. The flexible fingers 31 of first valve 5 enable assembly of the sleeve valve over the first transverse port 10 of the first body member 3. The flexible fingers also comprise the second shoulder of the first valve 5. The second shoulder 22 of the first valve 5 in combination with the second shoulder 20 of the first body member 3 restrain movement of the valve 5. See, FIGS. 5, 6 and 7.

In the preferred embodiment the valve 5 is made of plastic. Plastic has been found to be a suitable material for providing the flexibility of the fingers 31. However, the valve 5 and the flexible fingers can be made out of another material. Generally, the sanitary coupling of the present invention is made of plastic with the exception of the first and second springs (23, 28), the inner and outer clips (32, 34) and the various seals.

The second valve 5 also has a first shoulder 21 located thereon. The first body member 3 also has a first shoulder 19 located thereon. The first body member 1 has a first end portion 13 and a second end portion 14 as well as an intermediate portion 15. The first shoulder 19 of the first body member 3 is located generally in the intermediate portion of the first body member 1.

Figure 5:
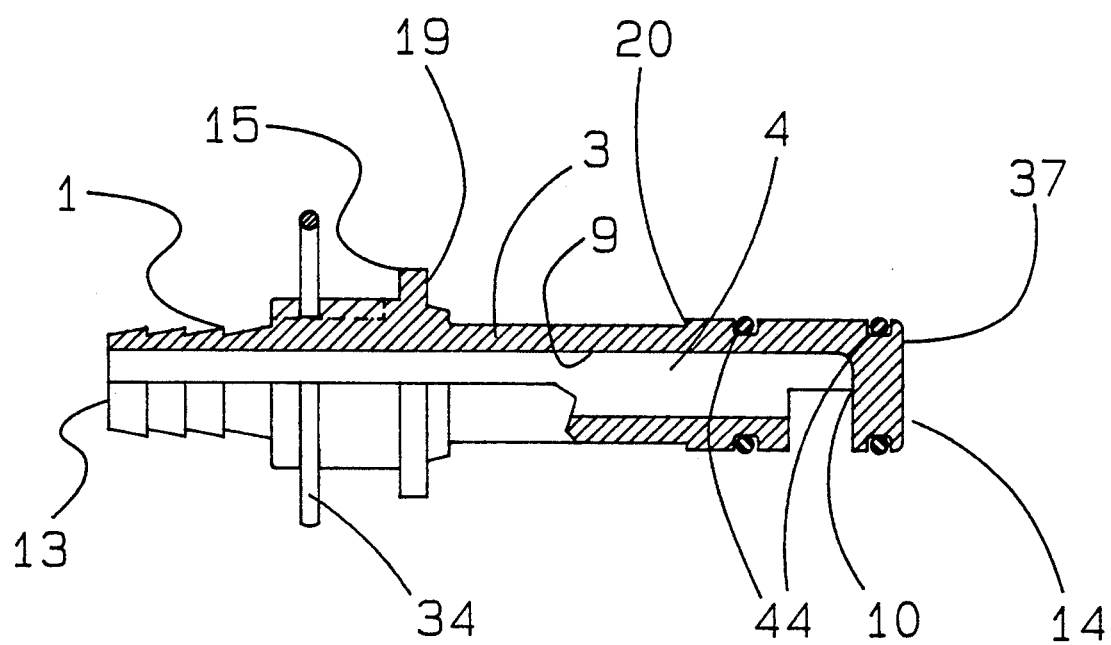
FIG. 5 is a partial side elevational view of the first body member of the coupler member.

The coupler member 1 has a first spring 23 disposed between the first shoulder 19 of the first body member and the first shoulder 21 of the first valve 5. The first spring 23 urges the first sleeve valve 5 toward the second end portion 14 of the first body member 3 when the coupler member is not engaging the nipple member 2. FIG. 5 illustrates a side view of the first body member of the coupler member without the first valve 5 and the spring 23 shown. FIG. 3 illustrates the retraction of the first valve 5 in the direction of the first end portion 13 of the first body member 1 during engagement of the coupler member 1 and the nipple member 2.

The first end portion 13 of the first body member 3 of the coupler member 1 is adapted to engage a hose leading from the source of the fluid and/or solids. It should be readily understood that any connection means could satisfy this purpose. The connection means of the stepped diameters present on the first end portion 13 of the first body member 1 have been found to be well suited for receiving a rubber tube or hose and this method is particularly secure when a clamp is used in conjunction therewith. These stepped diameters are sometimes referred to as hose barbs and are shown generally on the first end portion 13 of the first body member 3.

The coupler member 1 is secured to a panel or frame 46 as shown in FIG. 3. The coupler member 1 is inserted through the panel or frame and is retained in place by an inner clip 32 and an outer clip 34 as shown in FIG. 3. Other means could be used to hold the coupler member 1 in place with respect to the panel or frame 46 on the bed. It should also be emphasized that this coupler member could be held in place with respect to another device, for instance, a laboratory bench.

The nipple member 2 has a second body member 6 and a second longitudinal bore 11 therethrough. See, FIG. 2. The second body member 6 has a second transverse port 12 which intersects the second longitudinal bore 11. The second body member 6 has first and second end portions 16 and 17, respectively and an intermediate portion 18. The second transverse port 12 intersects the second longitudinal bore in said intermediate portion 18 of said second body member 6. See, FIG. 3.

The nipple member 6 has a second passageway 7 which includes the second transverse port 12 and a relatively small portion of the longitudinal bore 11. Passageway 7 can pass fluids and/or solids when valve 8 permits passage as is described hereinbelow. FIG. 3 shows transverse ports 10 and 12 of the first and second body members respectively. Further, FIG. 3 shows the second passageway 7 and the first passageway 4. FIG. 3 illustrates valves 5 and 8 in their second positions, or open positions, and the first and second passageways 4 and 7 communicating.

The second body member 6 of the nipple member 2 has a first end portion 16, a second end portion 17 and an intermediate portion 18. Additionally, the second longitudinal bore has first 24 and second 47 shoulders located thereon. A second valve 8 is movable between first and second positions and resides within said second longitudinal bore. The second valve member 8 has a first shoulder 27 and a second shoulder 26 located thereon. Retaining means 25 reside near the first end portion 16 of the second body 6 and consists of washer 35 and clip 36. The clip 36 resides in an annular recess 49 in the second longitudinal bore of the second body member 6. The washer 35 engages clip 36 as will be explained below.

A second spring 28 is disposed between the first shoulder 27 of the second valve 8 and the washer 35. Washer 35 is held against clip 36 by spring 28. The second valve 8 is restrained in the direction of the second end portion 17 of the second body 6 by the second shoulder 26 of said second valve 8 in conjunction with the first shoulder 24 on said second longitudinal bore 11. The second body 6 of nipple member 2 has a second transverse port 12. The second transverse port 12 intersects the second longitudinal bore 11 in said intermediate portion 18 of said second body member 6.

The first and second transverse ports 10 and 12, respectively, comprise ports having a 180° radial arc emanating from the first and second longitudinal bores 9 and 11, respectively. The first transverse port 10 and the second transverse port 12 in combination with the first and second passageways 4 and 7 provide a means for full unobstructed flow of both fluids and solids through the coupling when the coupler member 1 and said nipple member 2 are united.

Nipple member 2 is affixed to a container through conventional clamping means. FIG. 3 illustrates the nipple member 2 affixed to a container wall 39. The nipple member 2 is affixed to the container wall by means of a nut 40 threaded onto the nipple member 2 and restrained by a mounting shoulder 41 on the body 6 of the nipple member 2. The nipple member 2 also employs a sealing means 42 for sealing the nipple member as it is inserted into the container wall.

The coupler member, as previously stated, is secured in place with respect to a panel 46 on a bed or some other mounting device. The nipple member 2 is affixed to another mounting surface different from the mounting surface that the coupler member is mounted to. The coupler member and the nipple member are secured relative to the frame and the container, respectively, prior to engagement. When the present invention is used in conjunction with a sanitary system on a bed pan, the coupler assembly is affixed to a bed and the nipple member is affixed to a container.

The container together with said nipple member 2 is brought into engagement with the coupler member 1. The first spring 23 and the second spring 28 resist the engagement of the nipple and coupler members and urge the coupler and nipple members apart. Therefore, a latch means 43 is employed which latches the container, and, hence the nipple member, to the panel, and, hence, the coupler member.

The coupler and nipple members include means for aligning the first 10 and second 12 transverse ports. Specifically, the coupler member 1 is secured to the frame 46 by inner clip 32 which includes an orienting tab 50 and stud 52 in conjunction with outer clip 34. Outer clip 34 is a hairpin clip in the preferred embodiment. The orienting tab 50 engages a recess 51 in first body 3. The inner clip 32 is fixed in position with respect to the frame 46 by stud 52 which resides in a bore 53 located in frame 46. Spring washer 54 resides between inner clip 32 and third shoulder 55 on the firs body member 3. Spring washer 54 ensures that the coupler member fits snugly to the frame 46. The spring washer 54 also provides flexibility for coupling the coupler and nipple members together when, for instance, the container and nipple member are not perfectly in alignment with the coupler member.

Figure 8:
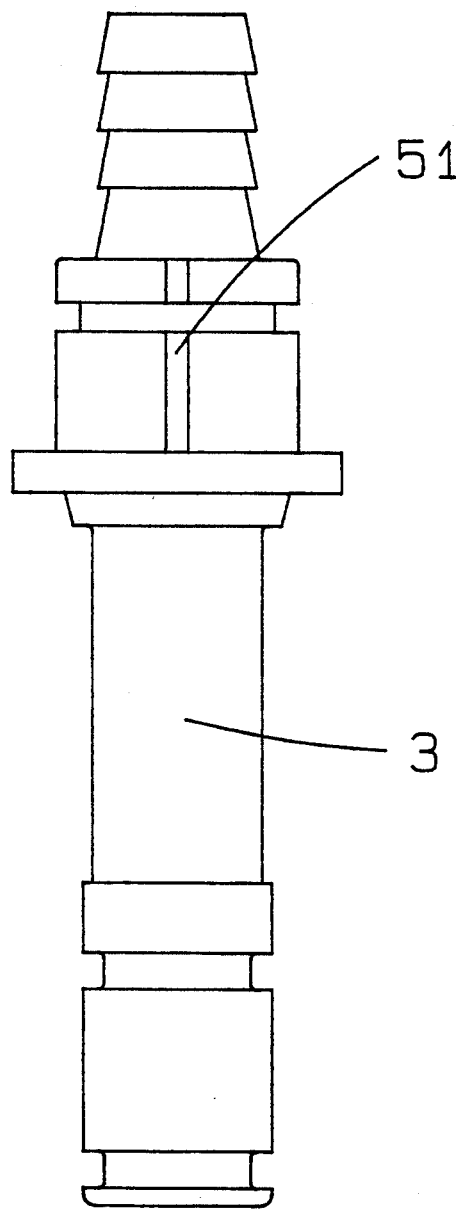
FIG. 8 is a top plan view of the first body member of the coupler member.
Figure 9:
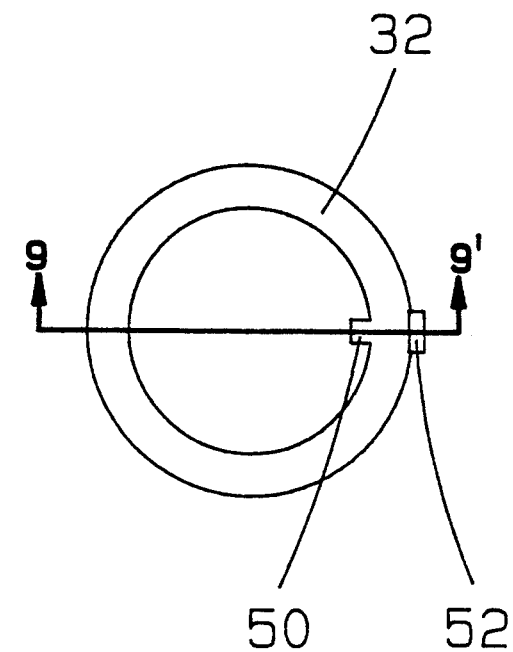
FIG. 9 is a view of the inner clip 32 showing orienting tab 50 and stud 52.
Figure 10:
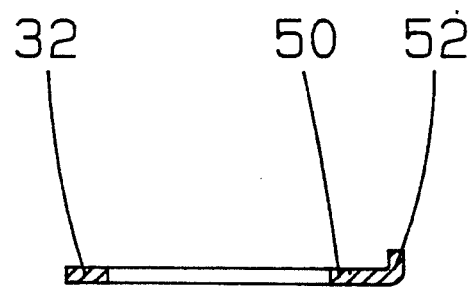
FIG. 10 is a sectional view of clip 32 taken along lines 9—9' as shown in FIG. 9.

FIG. 8 illustrates a top plan view of the first body member 3 of the coupler member. Recess 51 together with inner clip 32, orienting tab 50 on inner clip 32, and stud 52 on inner clip 32 orient the first body member 3 with respect to the frame 46.

In a similar fashion, second body 6 of nipple member 2 has a bore 33 in the second end portion thereof. The bore 33 permits orientation of the second transverse port as the nipple member is affixed to the container 39. This is performed by positioning and maintaining the nipple member with bore 33 oriented vertically upward followed by tightening nut 40. The aforestated orientation ensures alignment of the first 10 and second 12 transverse ports with respect to each other. FIG. 3 illustrates alignment of the ports, orientation of the bore 33 and the orientation of the stud 52. In the preferred embodiment, the first and second transverse ports are oriented downward so that the sanitary waste is directed to the bottom of its container.

The latch means 43 resists the separational forces exerted by the first spring 23 and the second spring 28. When the coupling of the present invention is used in connection with a bed pan sanitary waste removal system, the container 39 is latched to the frame 46 of the bed. When the container 39 becomes full of waste and requires removal, the latch means 43 is released and the container together with the nipple member is removed to the site at which the waste can be sanitarily disposed.

The first valve 5 is a sleeve valve in the preferred embodiment. The first valve 5 slides over the first transverse port 10 when the nipple member and the coupler member are disengaged. The first valve 5 is sealed by first sealing means 44 when said coupler member and said nipple member are disengaged. In the preferred embodiment the first sealing means 44 of the first valve 5 are O-rings. Similarly, the second valve 8 has second valve sealing means 45. In the preferred embodiment, the second valve sealing means is an O-ring. When the coupler member and the nipple member of the present invention are disengaged, it is important that the sanitary waste not be exposed to the environment. The sealing means 44 and 45 of the first and second valves 5 and 6, respectively, have been found to provide good seals.

When the coupler member 1 and the nipple member 2 are brought into engagement, the sealing means 44 provide an effective seal against loss of any of the waste material. The sealing means 45 reside in a circumferential groove 48 in the second valve 8 of the nipple member 2. In the preferred embodiment, the sealing means 45 is an O-ring. The sealing means 45 are operative during disengagement of the coupler and nipple members.

When the coupler member and the nipple member engage, the face 37 of the first body engages the face 38 of the second valve 8. During the process of engagement, the face 37 of the first body urges the second valve 8 in a direction toward the first end portion 16 of the nipple member 6. Similarly, in the process of engagement, the first valve 5 is urged in the direction of the first end portion 13 of the first body 3 by the second body 6 of the nipple member 2. In particular, the second shoulder 47 of the second longitudinal bore 11 engages the first valve 5 and urges the first valve 5 toward the first end portion 13 of the first body member 1. See, FIG. 3. Auxiliary seal 56 provides a seal between valve 5 and second body member 6. The first spring 23 resists the movement of the first valve 5 in the direction of the first end portion 13 of the first body 3 of the coupler member 1. Similarly, the second spring 28 resists movement of the second valve 8 in the direction of the first end portion 16 of the second body member 6 of the nipple member 2. When the coupler 1 and nipple members 2 are fully engaged (FIG. 3), first valve 5 and second valve 8 have been moved to their second positions respectively allowing a full and unobstructed passageway from the first end portion of the first body to the first transverse port 10 of the first body and through the second transverse port 12 of the second body. The present invention provides an unobstructed passageway for fluids and/or fluids mixed with solids to flow.

Additionally, when the nipple and coupler members are fully engaged, the passageway that has been described offers little or no resistance to the flow of fluids and solids therethrough. This, in turn, is an additional benefit of the present invention in that a smaller pump is required to displace the same amount of liquids and/or solids and liquids than would otherwise be required. A pump is typically sized based on the flow requirements and the resistance that is expected to be encountered in the flow line. Typically, for a ⅜" size sanitary coupling of the present invention, it has been found that a 17 psig pump is sufficient to pump the waste material. Other pump sizes could be used depending on the characteristics desired.

An additional benefit of a low pressure system such as the one being described is that sealing is easily effected. Additionally, the coupling disclosed herein as the preferred embodiment will see hydraulic pressures that are at or near atmospheric pressure at the point of discharge from the second transverse port into the container 39. The container 39 is at atmospheric pressure because it is vented.

While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

I claim:

1. A sanitary coupling comprising a coupler member and a nipple member, said coupler includes a first body member having a first passageway and a first valve means, said nipple member includes a second body member having a second passageway and a second valve means, said first and second valve means permit communication of said first and second passageways during union of said coupler and nipple members, said first body member of said coupler member includes a first end portion, a second end portion, and an intermediate portion, said first passageway includes a first longitudinal bore and a first transverse port disposed in said intermediate portion of said first body member intersecting said first longitudinal bore, said second body member of said nipple member includes a first end portion, a second end portion, and an intermediate portion, said second body member includes a second longitudinal bore extending from said first end portion to said second end portion of said second body member, said second passageway includes a second transverse port disposed in said intermediate portion of said second body member intersecting said second longitudinal bore, said first body member of said coupler member includes first and second shoulders thereon and said first valve means includes first and second shoulders thereon, a first spring disposed between said first shoulder of said first body member and said first shoulder of said valve means, said first spring urging said valve means toward said second end portion of said first body member, said second shoulder of said first body member engaging said second shoulder of said valve means restraining movement of said first valve means past said second end portion of said first body member when said coupler and nipple members are disunited, said second longitudinal bore of said second body member of said nipple member includes a first shoulder and retaining means adapted to reside within said second longitudinal bore, said second valve means of said second body member includes a first shoulder and a second shoulder, a second spring disposed between said retaining means and said first shoulder of said second valve means urging said second valve means toward said second end portion of said second body member, said second shoulder of said second valve means engages said first shoulder of said second longitudinal bore restraining movement of said second valve means when said coupler and nippler member are disunited.

2. A sanitary coupling as claimed in claim 1 wherein said first spring urges and positions said first valve means completely obstructing said first passageway, said second spring urges and positions said second valve means completely obstructing said second passageway.

3. A sanitary coupling as claimed in claim 2 wherein said first valve means is a sleeve valve.

4. A sanitary coupling as claimed in claim 3 wherein said coupler and nipple members include means for aligning said first and second transverse ports.

5. A sanitary coupling as claimed in claim 4 including means for latching said coupler and nipple members during union therebetween.

6. A sanitary coupling as claimed in claim 5 wherein said first and second body members are plastic.

7. A sanitary coupling comprising a coupler member and a nipple member, said coupler member having a first body member, said first body member having a first longitudinal bore and a face, said first body member having first and second shoulders, a first valve movable between first and second positions, a first spring, said first valve having first and second shoulders, said first spring disposed between said first shoulder of said first body and said first shoulder of said valve, said first spring urging said first valve toward a first position and against said second shoulder of said body, said first body member having a first transverse port, said first transverse port communicating with said first longitudinal bore, said nipple member having a second body member, said second body member having a second longitudinal bore therethrough, said second longitudinal bore having first and second shoulders thereon, a second valve movable between first and second positions, said second valve member having first and second shoulders and a face, a second spring, a clip, a washer, said clip adapted to reside within said longitudinal bore of said second body member, said clip retaining said washer, said second spring residing between said first shoulder of said second valve and said washer, said second spring urging said second valve toward a first position and against said first shoulder of said second longitudinal bore, said second shoulder of said second valve engaging said first shoulder of said second longitudinal bore, said second body member having a second transverse port, said face of said first body member of said coupler member engaging said face of said second valve of said nipple member urging said second valve toward second position, said first valve of said coupler member engaging said second shoulder of said second longitudinal bore of said second body member urging said first valve toward a second position, whereby, said first transverse port of said first body member of said coupler member communicates with said second transverse port of said second second body member of said nipple member permitting passage of fluids and/or solids through said coupler and nipple members.

8. A sanitary coupling as claimed in claim 7 wherein said transverse port of said first body member includes a 180° radial arc.

9. A sanitary coupling as claimed in claim 8 wherein said transverse port of said second body member includes a 180° radial arc.

10. A sanitary coupling as claimed in claim 9 wherein said first body member includes means for sealing said transverse ports of said first and second body members.

11. A sanitary coupling as claimed in claim 10 wherein said means for sealing said transverse port of said first body member includes a plurality of flexible O-rings.

12. A sanitary coupling as claimed in claim 11 wherein said means for sealing said transverse port of said second body member includes a plurality of flexible O-rings.

13. A sanitary coupling as claimed in claim 12 further including said first valve having first and second end portions, said first end portion of said first valve having flexible fingers, said flexible fingers comprising said second shoulder of said first valve, said second shoulder of said first valve restraining movement of said first valve through engagement of said second shoulder of said first body member when said coupler and nipple members are disengaged.

14. A sanitary coupling as claimed in claim 13 wherein said coupler and nipple members include means for aligning said first and second transverse ports.

15. A sanitary coupling as claimed in claim 14 including means for restraining separation of said coupler member and said nipple member during union therebetween.

16. A sanitary coupling as claimed in claim 15 wherein said coupler member and said nipple members are substantially plastic.

* * * * *